United States Patent
Gruber et al.

(10) Patent No.: US 9,401,782 B2
(45) Date of Patent: Jul. 26, 2016

(54) TEST SYSTEM AND A TEST METHOD FOR DETERMINING PROCESSING PARAMETERS OF AUDIO AND/OR VIDEO DATA

(71) Applicant: Rohde & Schwarz GmbH & Co. KG, Munich (DE)

(72) Inventors: Ingo Gruber, Munich (DE); Harald Ibl, Steinhöring (DE); Harald Gsödl, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 263 days.

(21) Appl. No.: 13/944,138

(22) Filed: Jul. 17, 2013

(65) Prior Publication Data

US 2014/0022923 A1    Jan. 23, 2014

(30) Foreign Application Priority Data

Jul. 17, 2012   (DE) .......................... 10 2012 212 485

(51) Int. Cl.
*H04L 1/24*   (2006.01)
*H04L 1/20*   (2006.01)

(52) U.S. Cl.
CPC ................ *H04L 1/242* (2013.01); *H04L 1/205* (2013.01)

(58) Field of Classification Search
CPC ................................. H04L 1/242; H04L 1/205
See application file for complete search history.

(56) References Cited

U.S. PATENT DOCUMENTS 6,414,960 B1 *   7/2002  Kuhn et al. ............... 370/395.64
7,707,031 B2 *   4/2010  Saraby ......................... 704/228
2002/0046308 A1   4/2002  Devlin et al.
2003/0204794 A1 * 10/2003  Barrett et al. ................. 714/704
2004/0170392 A1 *  9/2004  Lu et al. ........................... 386/96
2006/0245364 A1 * 11/2006  Zhu et al. ....................... 370/241
2007/0091207 A1   4/2007  Aufranc et al.
2011/0263243 A1 * 10/2011  Topaltzas et al. ............. 455/423

FOREIGN PATENT DOCUMENTS

EP    2127430 B1    3/2012

OTHER PUBLICATIONS

Ball, C.F. et al., "Introducing 3 G like Conversational Services in GERAN Packet Data Networks," IEEE VTC, May 2005, vol. 4, pp. 2186-2191.

* cited by examiner

*Primary Examiner* — Andrew Lai
*Assistant Examiner* — Chuong M Nguyen
(74) *Attorney, Agent, or Firm* — Ditthavong & Steiner, P.C.

(57) ABSTRACT

The test system according to the invention for determining processing parameters of audio and/or video data in a mobile-radio device with a test device (10) comprising an audio/video unit (11) which stores the audio/video data and outputs them as audio and/or video data-packets. Moreover, the test device (10) comprises a mobile-radio unit (12), which is connected to the audio/video unit (11), whereas the mobile-radio unit (12) is embodied for the transmission of the audio and/or video data via a mobile-radio interface (17) to a mobile-radio device (30) under test; a detection unit (13), which is connected to the mobile-radio device (30) under test and is embodied in order to detect audio and/or video data; and an analysis unit (14), which is connected to an analysis interface (15) between the audio/video unit (11) and the mobile-radio unit (12) and to the detection unit (13).

18 Claims, 2 Drawing Sheets

TEST SYSTEM AND A TEST METHOD FOR DETERMINING PROCESSING PARAMETERS OF AUDIO AND/OR VIDEO DATA

FIELD OF THE INVENTION

The invention relates to a test system and a method for determining processing parameters, especially the processing rate of audio and/or video data in a mobile-radio device. It claims priority of German Patent Application No. 10 2012 212 485.3.

BACKGROUND ART

Alongside pure voice links, modern mobile-radio devices can also perform multimedia data services, such as a video chat.

Before the use of such mobile-radio devices in a mobile radio network, the mobile-radio devices are tested with regard to their functional efficiency by the manufacturer and also by mobile-radio network operators.

By way of example, document EP 2 127 430 B1 describes a test method and a test device for testing such modern mobile-radio devices with a plurality of antennas. In this case, a test bit sequence is generated in a test device, converted, according to a given mobile-radio standard, into a test signal and transmitted to the mobile-radio device. The mobile-radio device receives the test signal and, taking into consideration the evaluated test signal, generates a response signal and specifies a transmission key for the transmission of the response signal to the test device.

These tests check the functions of the mobile-radio device which are necessary for the mobile-radio-specific transmission of the signals. Alongside these mobile-radio-specific functions, it is also necessary to check the functionalities for applications, such as the generation and reception of audio and/or video data, abbreviated here as audio/video data.

Not only can a mobile-radio device play back music and videos, it can also itself generate audio/video data. This is implemented, for example, by means of a camera and microphone. In this context, it is important to measure which processing rate (delay) the hardware and software internal to the mobile-radio device provides, in order to generate digital signals from the analog data. Furthermore, it is important to investigate whether the processing rate changes over time. This is also referred to as jitter. Other processing parameters such as packet error rates etc. are also relevant.

With existing tests, the time between the reading out of the audio/video data from a buffer in a test device and the playback of these audio/video data on a display of the mobile-radio device is conventionally measured, whereas, for example, the appearance of the data on the screen is registered by an external camera and the end time for the transmission is determined from this.

On the one hand, this has the disadvantage that additional devices, such as the camera, are required in order to determine the end time in the test system. On the other hand, the test device requires further functionalities, such as an encoder, a packer and functionalities for segmenting and formatting the data for a transmission with a protocol stack, in addition to the functionalities for the radio transmission via the mobile-radio network. These account for up to 50% of the processing time by the test device. Meaningful information about the actual processing rate of the audio/video data in the mobile-radio device itself is not available.

Accordingly, one object of the present invention is to provide a test system and a method with which processing parameters of audio/video data can be determined in a mobile-radio device without also needing to measure processing times outside the mobile-radio device, which are generated especially by audio/video functions in the test device.

SUMMARY OF THE INVENTION

The test system according to the invention for determining processing parameters of audio and/or video data in a mobile-radio device with a test device comprises a test device with an audio/video unit which stores audio/video data and outputs them as audio and/or video data. Furthermore, the test device comprises a mobile-radio unit which is connected to the audio/video unit, whereas the mobile-radio unit is embodied for transmission of the audio and/or video data via a mobile-radio interface to the mobile-radio device under test; a detection unit which is connected to the mobile-radio device under test and embodied for the detection of audio and/or video data; and an analysis unit which is connected to an analysis interface between the audio/video unit and the mobile-radio unit and to the detection unit. The analysis unit is embodied to detect the audio and/or video data at the analysis interface and in the detection unit. Accordingly, only the processing parameters within the mobile-radio device are taken into consideration; the processing parameters of the audio/video unit in the test device are not included in the measurement.

It is particularly advantageous if the processing parameter is the processing rate, and the analysis unit is embodied to determine the processing parameters from the delay time of the audio and/or video data between the first interface and the detection unit.

This has the advantage that the processing time of the audio/video data in the audio/video unit of the test device, especially the strongly time-variable processing rate of an encoder, is not included in the delay-time measurement. The delay time of the data through the mobile-radio unit of the test device is known with sufficient accuracy and can be deducted from the measured delay time with good accuracy. Accordingly, the delay time of the data exclusively through the mobile-radio device can be determined with sufficient accuracy.

It is particularly advantageous if the analysis unit measures the audio and/or video data at the analysis interface, determines from them a statistical parameter and then specifies the start time and/or the end time of the measurement whenever a change in the statistical parameter occurs. Audio/video data are conventionally transmitted to the destination terminal device using an IP transmission protocol. In this context, data packets of different size and with different time intervals are prepared corresponding to the data volume to be transmitted. Various statistical parameters and especially an abrupt change can easily be measured by monitoring the datastream downstream of the audio/video unit. Audio/video data can also be easily generated with a corresponding output of data packets.

It is particularly advantageous to determine the packet rate and/or the packet size as the statistical parameter. This can be determined very readily, because only the start and/or the end of a data packet must be registered.

It is especially advantageous if the audio/video unit generates test data in the test device and/or registers and/or outputs test data in the mobile-radio device, and the test data cause a change in a statistical parameter. This allows automatic detection of the respective start time and end time of the measurement at the analysis interface, without segmenting the test data and without explicitly setting markers in the test data.

The test data advantageously comprise video data with at least one transition from a still image to a moving-image sequence, especially an image sequence with noise, or the test data comprise audio data with at least one transition from silence to sounds. With the transmission of video data, only information relating to the image parts which have changed by comparison with the preceding image is conventionally generated. Accordingly, in the transmission of a still image, that is, without a change of the image information within an image sequence, only very few data packets are generated, which also have only a small packet size. An image sequence which contains noise, for example, white noise, comprises successive images in which very many image points differ from the preceding image. Accordingly, a large volume of data to be transmitted occurs, and the packet rate and/or the packet size rise very abruptly. The same applies in the case of audio data with a transition from silence to sounds. Such transitions lead to a major change in the statistical parameters of the packet transmission and are therefore ideally suitable as trigger points for the measurement.

The test data are advantageously contained in the mobile-radio device in an encoded form. Encoded and therefore compressed data provide a very much smaller data volume by comparison with un-compressed data and therefore require a very much slower reading speed of the audio/video unit in the mobile-radio device. Accordingly, mobile-radio devices with a slower reading speed can also be tested, and relatively longer audio and/or video sequences can be used.

It is advantageous if the detection device is connected to a decoder of the mobile-radio device under test, and if the mobile-radio device is embodied to route the audio/video data to the decoder in the mobile-radio device in the event of a transmission from the mobile-radio device to the test device and, downstream of the decoder, to route the test data at the same time to the detection unit and to an encoder in the mobile-radio device. This ensures that, in the case of an uplink measurement, that is, a transmission of data from the mobile-radio device to the mobile-radio network or, here, to the test device, the broadcast of the data to the detection unit via the decoder of the mobile-radio device can be transmitted, and the start time can therefore be registered. In particular, the start time is measured downstream of the decoder, so that its somewhat fluctuating processing time is not included in the measurement. The data output to the encoder of the mobile-radio device are routed via the audio/video function of the mobile-radio device for transmission to the test device, so that the processing time through the entire audio/video processing chain is measured.

The method according to the invention for determining at least one processing parameter of audio and/or video data in a mobile-radio device with a test device comprising an audio/video unit, a mobile-radio unit, a detection unit and an analysis unit comprises, as the first method step, the preparation and output of audio and/or video data as data packets by the audio/video unit. Following this, the data packets are transmitted to the mobile-radio unit. The audio and/or video data are received and processed in the mobile-radio device under test and then detected in the detection unit. Accordingly, the processing parameters for the processing of audio/video data in a mobile-radio device can be measured independently of an audio/video unit in the test device which can show strong time variation. A standardised encoder in the test device is not required.

BRIEF DESCRIPTION OF THE DRAWINGS

Exemplary embodiments of the test system according to the invention are presented by way of example in the drawings and explained in greater detail with reference to the following description. The drawings show.

DETAILED DESCRIPTION OF ILLUSTRATIVE EMBODIMENTS

Parts which correspond with one another in all of the drawings are provided with the same reference numbers. Throughout the description, audio data and/or video data are also referred to as audio/video data by way of abbreviation.

Figure 1:
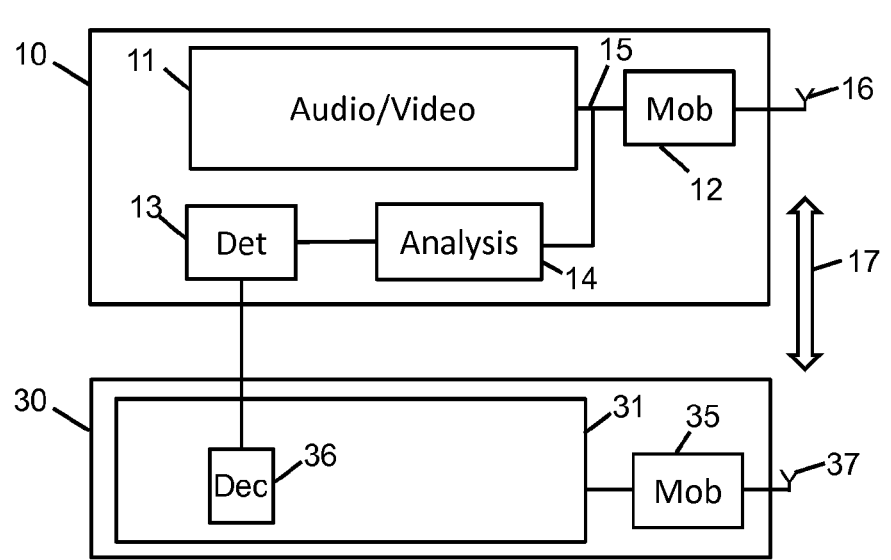
FIG. 1 a first exemplary embodiment of a test system according to the invention in a schematic view.

FIG. 1 shows a test system according to the invention with a test device 10 and a mobile-radio device 30, for example, a mobile device for user subscription in a cellular mobile-radio network, for example, according to the GSM, EDGE, 3G or LTE standard. The test device 10 comprises an audio/video unit 11 which is connected to a mobile-radio unit 12 via an analysis interface 15. The audio/video unit 11 comprises all of the functional units which are necessary for generating and receiving audio/video data. The mobile-radio unit 12 comprises all of the means necessary for the transmission of audio/video data on the air interface 17 of the mobile-radio network. An antenna 16, by means of which the conditioned data packets are transmitted to the mobile-radio device 30 under test, is connected to the mobile-radio unit 12. The mobile-radio device 30 also provides an antenna 37 which is connected to a mobile-radio unit 35 of the mobile-radio device 30. The mobile-radio unit 35 is, in turn, connected to an audio/video unit 31 in the mobile-radio device 30. As an alternative to radio transmission, the test device and the mobile-radio device 30 can also be connected via a cable.

The audio/video data received in the mobile-radio device 30 are received in the mobile-radio unit 35 and routed to the audio/video unit 31 of the mobile-radio device 30. There, the audio/video data are conditioned and, for example, presented on a display of the mobile-radio device 30. In parallel or as an alternative to this, the audio/video data are routed by a decoder 36 in the audio/video unit 31 to a detection unit 13.

A detection unit 13 in the test device 10 is connected to the decoder 36 in the audio/video unit 31 of the mobile-radio device 30. The connection is realised, for example, via a rigid connection, for example, a cable, and is accordingly short and time-stable by comparison, for example, with wireless connections. An MHL-HDMI (Mobile High-Definition Link/High Definition Multimedia Interface), a VGA (Video Graphics Array) analyser or also an image sensor can be used as the detection unit 13. Other detectors are also possible.

An analysis unit 14 is connected to the detection unit 13 and registers, for example, the time at which, for example, an image change is registered in the detection unit 13. This time is referred to as the second time and specifies either the start or the end time for a measurement. The analysis unit 14 is also connected to the analysis interface 15. The analysis unit 14 monitors the datastream at the analysis interface 15 and determines from it a statistical parameter. By way of example, the packet rate, that is, the number of packets per unit of time, the data rate, that is, the number of data per time, the packet length or others can be determined as the statistical parameter. A first time is set in the analysis unit 14 whenever an abrupt change is registered in a statistical parameter. The first time indicates the start time for a measurement in the downlink, that is, from the test device 10 to the mobile-radio device 30, or respectively the end time of a measurement in the uplink, that is, from the mobile-radio device 30 to the test device 10. The measurement points for the first and second time are therefore time synchronised.

Figure 2:
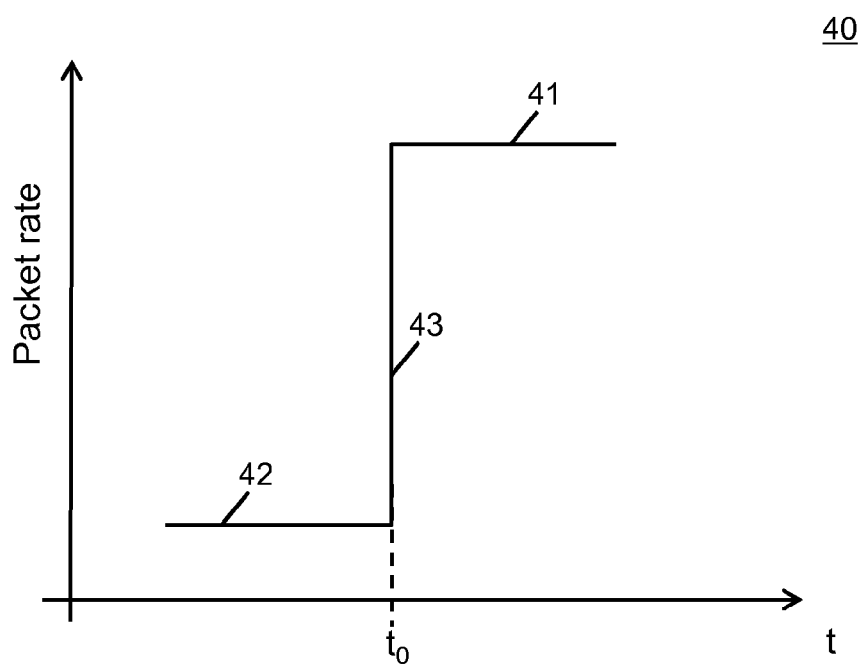
FIG. 2 a diagram of a determined statistical parameter according to the invention for determining the start time or respectively end time.

In FIG. 2, a diagram 40 of the determined packet rate is plotted against time. At a time $<t_0$, the packet rate provides a low value 42, which changes after time $t_0$ to a high packet rate 41. The transition from the low 42 to the high 41 packet rate amounts to approximately 20 ms and is given by the minimum interval between two packets. Such an edge 43, or such a rise or fall, is generated by video data, which provide, for example, a change from a still image to an image sequence with noise, from an image sequence with completely black images to noise or also, vice versa, from an image sequence with noise to a still image.

Audio data with at least one transition from silence to sound or from loud to soft are also suitable as test data. If silence predominates, only a few, generally short data packets are generated, whereas in the case of an incipient sound, the number of data packets and/or the length of data packets rises very steeply.

Figure 3:
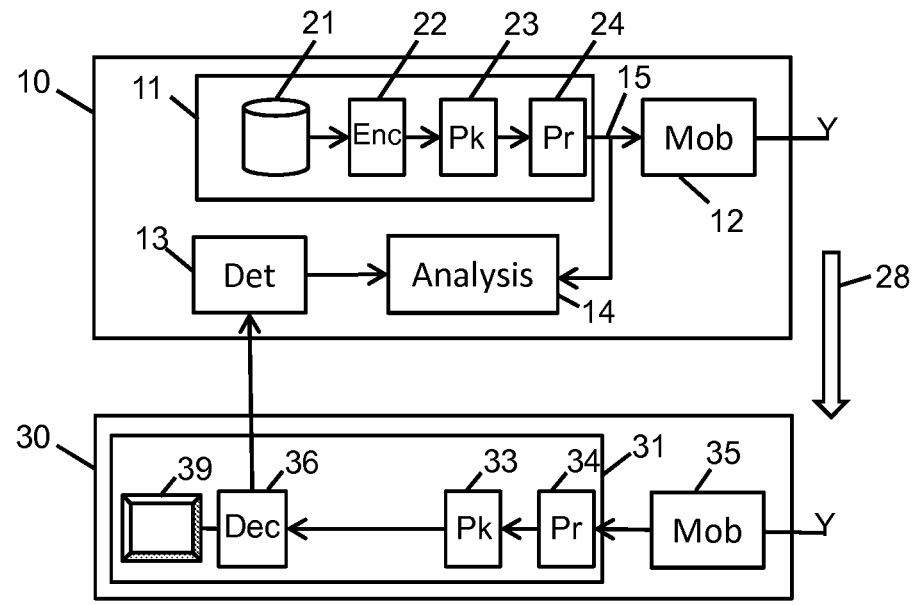
FIG. 3 an exemplary embodiment of the method according to the invention for determining a processing parameter in the case of a transmission from the tester to the mobile-radio device.

With reference to FIG. 3, the test system and the method for determining the processing rate of audio and/or video data in a mobile-radio device with a transmission in the downlink, that is, from the test device 10 to the mobile-radio device 30, will be described in detail. The audio/video unit 11 of the test device 10 comprises a buffer 21, which is connected to an encoder 22, and in which the test data are stored. The encoder 22 is connected to a packer 23 which is connected, in turn, to a protocol unit 24.

At the start of a measurement, the test data in the test device 10 are transferred from the buffer 21 to the encoder 22, which encodes the test data corresponding to a coding method, and routed to the packer 23, which combines the encoded data in the frame. The packer 23 passes the frames to a protocol unit 24 in which the frames are segmented according to the selected application and transmission protocol, for example, RTP/UDP/IP protocol stack, and provided with control information. These data packets are now routed via the first interface 15 to the mobile-radio unit 12, which conditions the data for the transmission on a mobile-radio air interface 28.

The data are now transmitted by the test device 10 to the mobile-radio device 30 and evaluated in the mobile-radio unit 35 of the mobile-radio device 30. The mobile-radio unit 35 is connected to the audio/video unit 31, which once again provides an application and transmission protocol unit 34 connected to a packer 33, the latter being connected in turn to a decoder 36, which is, once again, connected to a display 39. From the mobile-radio unit 35, the data are transferred to the audio/video unit 31 and passed from the protocol unit 34 via the packer 33 to the decoder 36. The decoded data packets are routed from there either via a display 39 and/or directly by the decoder 36 to the connected detection unit 13 of the test device 10.

The analysis unit 14 in the test device 10 detects an abrupt change at the first interface 15, for example, in the packet rate, and recognises from this the start time for the measurement. Conversely, the analysis unit 14 registers the arrival of the image change in the detection unit 13 and registers this as the end time of the measurement. From this, together with the transmitted data volume, the transmission rate or respectively processing rate of the audio/video unit 31 of the mobile-radio device 30 can now be determined. The processing time in the mobile-radio unit 25 of the test device is very short by comparison with the processing time, for example, in an encoder, and is also very time stable. If required, it can be determined separately and can therefore be calculated with good accuracy from the measured time. The same applies for the processing time of the mobile unit 35 in the mobile-radio device.

The mobile-radio device 30 conventionally comprises an external interface for the output of the received audio/video data, which is used to connect the detection unit 13. Accordingly, an internal interface within the mobile-radio device 30 is not necessary for the measurement. The method can therefore be used universally, especially for different types of mobile radio or respectively from different manufacturers.

Figure 4:
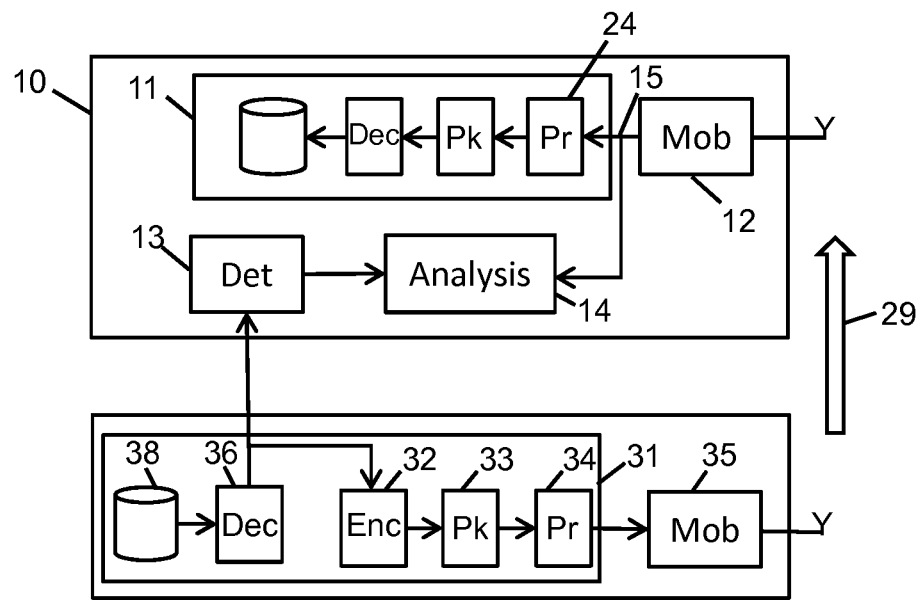
FIG. 4 an exemplary embodiment of the method according to the invention in the case of a transmission of audio/video data from the mobile-radio device to the test device in a schematic view.

The method for determining the transmission parameters of audio/video data in a mobile-radio device in the case of a transmission in the uplink, that is, from a mobile-radio device 30 to the test device 10, is illustrated in FIG. 4. For this purpose, test data of the content described above are stored in the buffer 38 before the measurement. The mobile-radio device 30 is placed into a special test mode, in which, on the one hand, the audio/video data are output from the buffer 38 to a decoder 36, which in turn outputs the latter at an output of the mobile-radio device which is connected to the detection unit 13. Conversely, the decoded audio/video signals are duplicated downstream of the decoder 36 and passed for transmission via the air interface to an encoder 33. Most mobile-radio devices already provide a functionality of this kind. This allows the observation of the audio/video records during the transmission.

Downstream of the encoder 32, the audio/video data are routed from the packer 23 to the protocol unit 34 and conditioned in the mobile-radio unit 35 for transmission 29 via the mobile-radio air interface. As already mentioned, instead of transmission via the air interface, a transmission via a cable can also be provided. In the test device 10, the signals are received and transferred from the mobile-radio unit 12 via the first interface 15 to the audio/video unit 24.

The detection unit 13 receives the audio/video signals output by the decoder 36. The connected analysis unit 14 recognises the abrupt change in the bit sequence and registers the time of the change as the start time for the measurement. The analysis unit 14 monitors the analysis interface 15 and, in the event of a change in the statistical parameter, registers the end time of the measurement. The difference between the two measured times is the processing time, in this case, now in the uplink direction. In this context, the unit 22 operates as a decoder.

Measuring the processing time downstream of the decoder 36 provides the advantage that the special embodiment of the decoder 36 in the mobile-radio device is not included in the uplink measurement. Accordingly, only the functionality of the mobile-radio device 30 for the transmission of the audio/video data is measured. As a result of measuring the end time at the first interface 15 in the test device 10, decoder-specific processing times etc. are irrelevant for the measurement. The determined processing time in the mobile-radio device 30 can therefore be tested independently of other influences.

In the mobile-radio device 30, only an internal interface which is connected to the detection unit 13 is necessary. With many mobile-radio devices, this interface is already present as an external interface. If this is not the case, it can be realised in a simple manner.

Accordingly, the analysis unit 14 determines different processing parameters of audio/video data in a mobile-radio device, such as, the processing rate, also described as the delay, and/or the fluctuation in the processing rate. Further parameters are also possible. The accuracy of the parameters determined is disposed within the range of measurement accuracy for the abrupt change of the statistical parameter which is used for determining the end time and respectively the start time. For example, this is approximately 20 ms and, with an average transmission time of 200 ms, represents an adequate accuracy.

Such a measurement is advantageously repeated several times in order to increase the accuracy of the processing parameters determined via statistical means. For this purpose, test data with repeating image changes are used both in the uplink measurement and also in the downlink measurement. In this manner, a plurality of measurements can be implemented sequentially and without the intervention of test personnel.

The invention is not restricted to the exemplary embodiments described. For example, especially, a packet-error rate, packet-loss rates etc. can also be determined as processing parameters. All of the features described and/or illustrated can be combined advantageously with one another within the scope of the invention.

What is claimed is:

1. A test system for determining at least one processing parameter of audio and/or video data in a mobile-radio device with a test device comprising:
   at least one audio/video unit, which outputs the audio and/or video data,
   a mobile-radio unit, which is connected to a respective audio/video unit, whereas the mobile-radio unit is embodied for the transmission of the audio and/or video data via a mobile-radio interface to the mobile-radio device under test or to the test device,
   a detection unit which is directly connected to a decoder of the mobile-radio device under test exclusively by a cable and embodied for the detection of the audio and/or video data, and an analysis unit, which is connected to an analysis interface between the mobile-radio unit and the respective audio/video unit of the test device and to the detection unit and which is embodied to detect the audio and/or video data at the analysis interface and in the detection unit,
   wherein said respective audio/video unit is located in the test device and generates test data and outputs test data directly to the mobile-radio unit and/or wherein another audio video/unit is located in the mobile-radio device and outputs test data directly to the detection unit of the test device.

2. The test system according to claim 1,
   wherein the processing parameter is a processing rate, and wherein the analysis unit is embodied in order to determine the processing rate from a delay time of the audio and/or video data between the analysis interface and the detection unit.

3. The test system according to claim 1,
   wherein the analysis unit measures the audio and/or video data at the analysis interface, determines a statistical parameter from them and fixes the start time and/or the end time for a measurement, when a change in the value of the statistical parameter occurs.

4. The test system according to claim 3,
   wherein the statistical parameter is a packet rate and/or a packet size.

5. The test system according to claim 1, wherein the test data cause an abrupt change in a statistical parameter.

6. The test system according to claim 5,
   wherein the test data comprise video data with at least one transition from a still image to a moving-image sequence, especially to an image sequence with noise.

7. The test system according to claim 5,
   wherein the test data comprise audio data with at least one transition from silence to sounds.

8. The test system according to claim 5,
   wherein the test data are contained in the mobile-radio device in an encoded form.

9. The test system according to claim 5,
   wherein in the case of a transmission from the mobile-radio device to the test device, the mobile-radio device is embodied to route the test data to the decoder of the mobile-radio device and, downstream of the decoder, to route the audio and/or video data at the same time to the detection unit and to an encoder in the mobile-radio device.

10. A method for determining at least one processing parameter of audio and/or video data in a mobile-radio device having a decoder, by a test system including at least one audio/video unit, a mobile-radio unit, and a test device having a detection unit and an analysis unit, with the following steps:
    provision and output of audio and/or video data as data packets by the audio/video unit, transmission of the audio and/or video data by the mobile-radio unit, reception and processing of the audio and/or video data in the mobile-radio device under test
    or the test device, and
    detection of the processed audio and/or video data in the detection unit,
    whereby test data from the audio/video unit are generated in the test device and are directly forwarded to the mobile-radio unit and/or whereby test data are registered by another audio/video unit in the mobile-radio device and are directly output to the detection unit of the test device, and
    whereby the detection unit is exclusively directly connected to the decoder of the mobile-radio device under test by a cable.

11. The method according to claim 10,
    whereby a first time is determined by the analysis unit, at which the audio and/or video data pass an analysis interface between the audio/video unit and the mobile-radio unit, and whereby a second time is determined by the analysis unit, at which the audio and/or video data are detected in the detector unit.

12. The method according to claim 10,
    whereby the audio and/or video data are measured at the analysis interface and whereby a statistical parameter is determined from them; and the first time is determined through a change in the value of the statistical parameter.

13. The method according to claim 12,
    whereby a packet rate and/or a packet size are determined as the statistical parameter.

14. The method according to claim 10, wherein the test data cause an abrupt change in a statistical parameter.

15. The method according to claim 14,
    whereby the test data comprise video data with at least one transition from a still image to a moving-image sequence, especially to an image sequence with noise are used as test data.

16. The method according to claim 14,
    whereby the test data comprise audio data with at least one transition from silence to sounds are used as test data.

17. The method according to claim 10,
whereby for a transmission from the mobile-radio device to the test device, the test data are contained in a coded form in the mobile-radio device.

18. The method according to claim 14,
whereby in the case of a transmission from the mobile-radio device to the test device, the test data are transferred to the decoder of the mobile-radio device, and downstream of the decoder, the test data are routed at the same time to the detection unit and to an encoder in the mobile-radio device.

\* \* \* \* \*